(12) United States Patent
Safavi

(10) Patent No.: US 11,480,955 B2
(45) Date of Patent: Oct. 25, 2022

(54) SMART BUILDING SENSOR NETWORK FAULT DIAGNOSTICS PLATFORM

(71) Applicant: Bridgewest Ventures LLC, San Diego, CA (US)

(72) Inventor: Saeid Safavi, San Diego, CA (US)

(73) Assignee: Bridgewest Ventures LLC, San Diego, CA (US)

( * ) Notice: Subject to any disclaimer, the term of this patent is extended or adjusted under 35 U.S.C. 154(b) by 106 days.

(21) Appl. No.: 17/180,398

(22) Filed: Feb. 19, 2021

(65) Prior Publication Data

US 2021/0173389 A1    Jun. 10, 2021

Related U.S. Application Data

(63) Continuation-in-part of application No. 16/355,474, filed on Mar. 15, 2019, now abandoned.

(60) Provisional application No. 62/643,868, filed on Mar. 16, 2018.

(51) Int. Cl.
| | |
|---|---|
| G05B 23/02 | (2006.01) |
| H04L 67/12 | (2022.01) |
| G16Y 40/20 | (2020.01) |
| H04L 41/06 | (2022.01) |
| H04L 43/08 | (2022.01) |
| G16Y 10/75 | (2020.01) |

(52) U.S. Cl.
CPC .......... G05B 23/0278 (2013.01); G16Y 40/20 (2020.01); H04L 41/06 (2013.01); H04L 43/08 (2013.01); H04L 67/12 (2013.01); G16Y 10/75 (2020.01)

(58) Field of Classification Search
CPC ..... H04L 41/0631; H04L 41/06; H04L 67/12; H04L 43/08; H04L 12/2829; H04L 69/40; H04L 41/142; G05B 23/0278; H04W 4/38; H04W 4/33; G16Y 40/20
See application file for complete search history.

(56) References Cited

U.S. PATENT DOCUMENTS

| | | | |
|---|---|---|---|
| 10,341,236 B2* | 7/2019 | Boutros | H04L 49/70 |
| 2018/0375760 A1* | 12/2018 | Saavedra | H04L 12/4633 |
| 2019/0098067 A1* | 3/2019 | Sandoval | H02J 13/00024 |
| 2019/0149467 A1* | 5/2019 | Gouache | H04L 45/30 |
| | | | 709/245 |
| 2019/0166099 A1* | 5/2019 | Hicks | H04L 63/0272 |
| 2019/0245927 A1* | 8/2019 | Auerbach | G06F 16/9035 |
| 2019/0253893 A1* | 8/2019 | Hodroj | H04W 48/18 |
| 2019/0268633 A1* | 8/2019 | Jayawardene | H04N 21/23103 |
| 2019/0297356 A1* | 9/2019 | Sivaraj | H04L 65/611 |
| 2021/0114616 A1* | 4/2021 | Altman | H04W 36/00837 |

* cited by examiner

*Primary Examiner* — Syed Ali
(74) *Attorney, Agent, or Firm* — Jaquez Land Greenhaus & McFarland LLP; Bruce W. Greenhaus, Esq.

(57) ABSTRACT

An approach for diagnosing degradations in performance and malfunctions in sensor networks is disclosed. This approach is based on so-called "fault signatures". Such fault signatures are generated for known fault conditions through a statistical analysis process that results in each known fault having a unique fault signature. Such unique fault signatures can then point to the root cause of a problem.

10 Claims, 6 Drawing Sheets

SMART BUILDING SENSOR NETWORK FAULT DIAGNOSTICS PLATFORM

CROSS-REFERENCE TO RELATED APPLICATIONS—CLAIM OR PRIORITY

The present application is a continuation of, and claims the benefit of priority under 35 USC § 120 of, commonly assigned and co-pending prior U.S. application Ser. No. 16/355,474, filed Mar. 15, 2019, entitled "Smart Building Sensor Network Fault Diagnostics Platform", the disclosure of which is incorporated herein by reference in its entirety. Application Ser. No. 16/355,474 claims priority to U.S. Provisional Application No. 62/643,868, filed on Mar. 16, 2018, entitled "Smart Building Sensor Network Fault Diagnostics Platform", which is herein incorporated by reference in its entirety.

BACKGROUND

(1) Technical Field

Systems and methods for managing a smart home network and more particular a method and apparatus for diagnosing performance of a sensor network within a smart home.

(2) Background

Smart homes have started to become more popular recently. Smart homes are home environments in which the occupant can monitor and control features and devices of the home, such as lights, thermostat, manage the contents of the refrigerator, play music with voice commands, etc. As smart homes get more sophisticated, several sensors are being installed in such smart homes. With the unprecedented growth in the number of sensors and actuators in smart homes, buildings, public venues, and industrial applications, the importance of having smart fault diagnostics of these networks continues to grow. In most cases, network connectivity between devices in such smart homes is provided in accordance with wireless standards (e.g., WiFi, BT, LoRaWAN, 6loWPAN, NB-IoT, etc.). Such networks are usually deployed with minimal or no site survey. This is true, even when the network is installed by a professional network management team. Many instances in which "Internet of Things" (IoT) devices are connected to a smart home network require the data that flows between the IoT device and the network to be managed through a data application that can operate within a poorly designed sensor network. In many such instances, the interface between the IoT device and the network will not run optimally. That is, a significant number of retransmissions may occur, power consumption may increase and significant delay may occur, even in delay sensitive use cases. This problem may frequently remain unnoticed for data applications that can withstand a greater number of layer 2 retransmissions (as a result of re-transmissions). However, applications like URLLC (Ultra-Reliable Low Latency Communications) are more susceptible to late or inconsistent packet delivery due to these retransmissions.

Therefore, there is current a need for a smart home network that can operate efficiently with an array of sensors that each have different network requirements and conditions.

DESCRIPTION OF THE DRAWINGS

Like reference numbers and designations in the various drawings indicate like elements.

DETAILED DESCRIPTION

Figure 1:
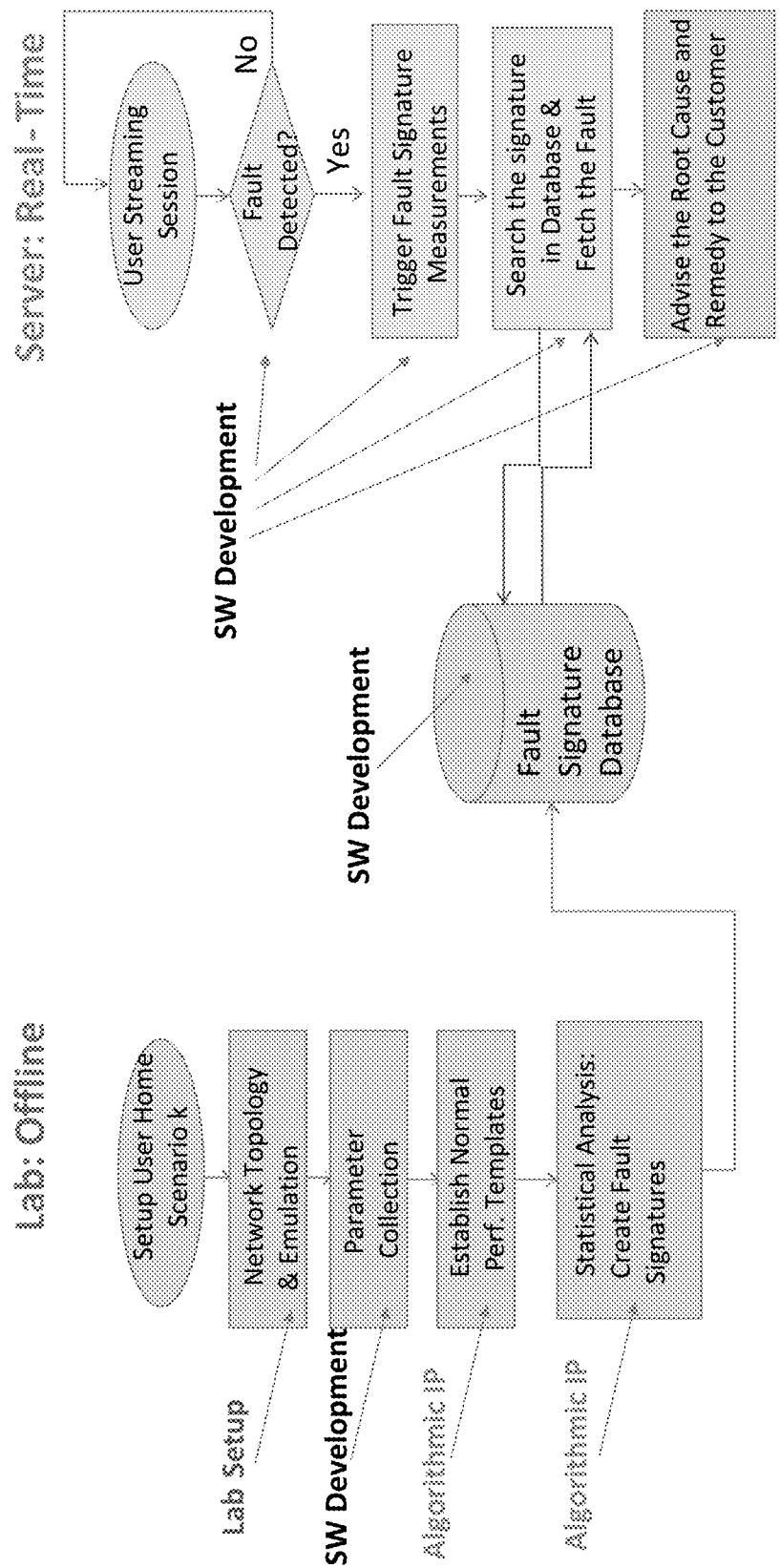
FIG. 1 illustrates one embodiment of the disclosed method and apparatus in which the diagnostics engine uses two processes to detect fault conditions.

Smart home systems and other networks that require an array of sensor devices and other "Internet of Things" (IoT) devices to pass data over a local area network can benefit from a system that enables an understanding of, and an ability to address, IoT networking issues. In accordance with the disclosed method and apparatus, a system is provided that includes a fault diagnostics platform that can capture radio signal impairments. Capturing such radio signal impairments will greatly assist with fault diagnostics in general. This is because identifying major contributors to connectivity issues (or ruling out such contributors) allows the contributing issues, such as "Network problems", or "Software Bugs", to be more effectively isolated so that they can be dealt with.

The disclosed method and apparatus provides an approach for diagnosing degradations in performance and malfunctions in sensor networks. This approach is based on so-called "fault signatures". Such fault signatures are generated for known fault conditions through a statistical analysis process that results in each known fault having a unique fault signature. Such unique fault signatures can then point to the root cause of a problem.

In some embodiments, fault signatures are generated using "testbed experiments". The generated fault signatures help in diagnosing network faults and distinguishing them from legitimate network events that occur during normal operation. In addition, performance variations that occur over time resulting in changes to the conditions of selected parameters during normal functioning of a network can be distinguished from changes in the conditions of parameters that occur in a network as a result of the network experiencing fault conditions.

The approach provided by the disclosed method and apparatus assists in identifying the root cause of a fault condition. This is done by capturing the state of one or more selected network parameters before a fault occurs. The conditions of the selected network parameters that exist during normal operation are characterized. In addition, conditions that are known to exist for the selected parameters, or suspected to exist, in the presence of several selected faults are characterized. In some embodiments, this characterization of these conditions is established using a "testbed" to emulate conditions of the selected parameters. At a later time, these same network parameters are captured in an operating network. The conditions of the selected network parameters are characterized. The later captured and characterized parameters are then compared to the conditions of the parameters that existed in either normal operation (i.e., operation that occurs when there are no faults present) or defective operation (i.e., operation that occurs in the presence of at least one fault) or both. If the conditions of the selected network parameters appear to match conditions that occur during normal operation, the system is assumed to be operating normally. However, if the conditions of the selected network parameters appear to resemble conditions that exist during defective operation, then the system is flagged as potentially operating in a defective mode or with at least one fault condition present. In some embodiments, a fault diagnostics platform learns and adjusts to various networking scenarios that are unique to the particular network in which the fault diagnostics platform is operating. In one embodiment, this is achieved by creating a "3D fault signature cubic matrix".

FIG. 1 illustrates one embodiment of the disclosed method and apparatus in which a fault diagnostics platform uses two processes to detect fault conditions. The first process is an offline "lab-based" process. In the offline lab-based process, a testbed is used. In some embodiments, the testbed is configured to emulate the conditions that exist for selected parameters during the operation of a specific user network. In some embodiments in which the network includes both the wired and the wireless segments, the testbed emulates the conditions for parameters in both the wired and wireless segments. The wired segment constitutes a specific network topology. This topology may include specific sensor devices, a network of wireless devices conforming to a particular wireless industry standard, and any wired media (e.g., twisted pair, coaxial cable, etc.) used to connect devices of the network and which may be the source of a network fault. In some embodiments, the conditions of the parameters of the wireless segment are determined by emulating standard channel models in the testbed. Alternatively, the testbed emulates the wireless segment using custom channel models that can reproduce the environment of a specific user's home/building type and topology in order to generate the conditions of the selected parameters during normal operation and in some embodiments, during defective operation.

The offline process starts with configuring the wired and wireless segments of the network in a manner that produces the conditions of the selected parameters during normal (i.e., fault free) operation of the network. In some embodiments, samples of the conditions of the selected parameters are used to generate fault signatures that enable performance tracking. These samples typically form a vector in a time series. Accordingly, samples taken for each parameter have values that are associated with respective points in time to establish the vector in the time series.

The second process is a real-time or online process. In some embodiments, the online process is continuously run on a centralized diagnostics server (or sever farm). In some embodiments, the process starts when signs of an anomaly are detected (e.g., evidence is detected that a potential fault condition exists or is eminent). Such real-time online detection is performed by continuously monitoring higher layer parameters at the application level (such and bandwidth, delay, jitter, etc.). Once a potential anomaly or fault is detected, a next level of granularity in monitoring is started.

In this next level of monitoring, a set of parameters used to establish each fault signature is correlated across layers. This is repeated for each fault and the signatures are constantly compared to a baseline, until an exact match (or the best match) is found.

Accordingly, fault diagnostics are provided for sensor/actuator networks, based on fault signature capture. The disclosed method and apparatus can be used as part of network management entity for smart homes/buildings as well as public venues, and places. A novel cross-layer approach is used to provide fault detection and analysis.

Figure 2:
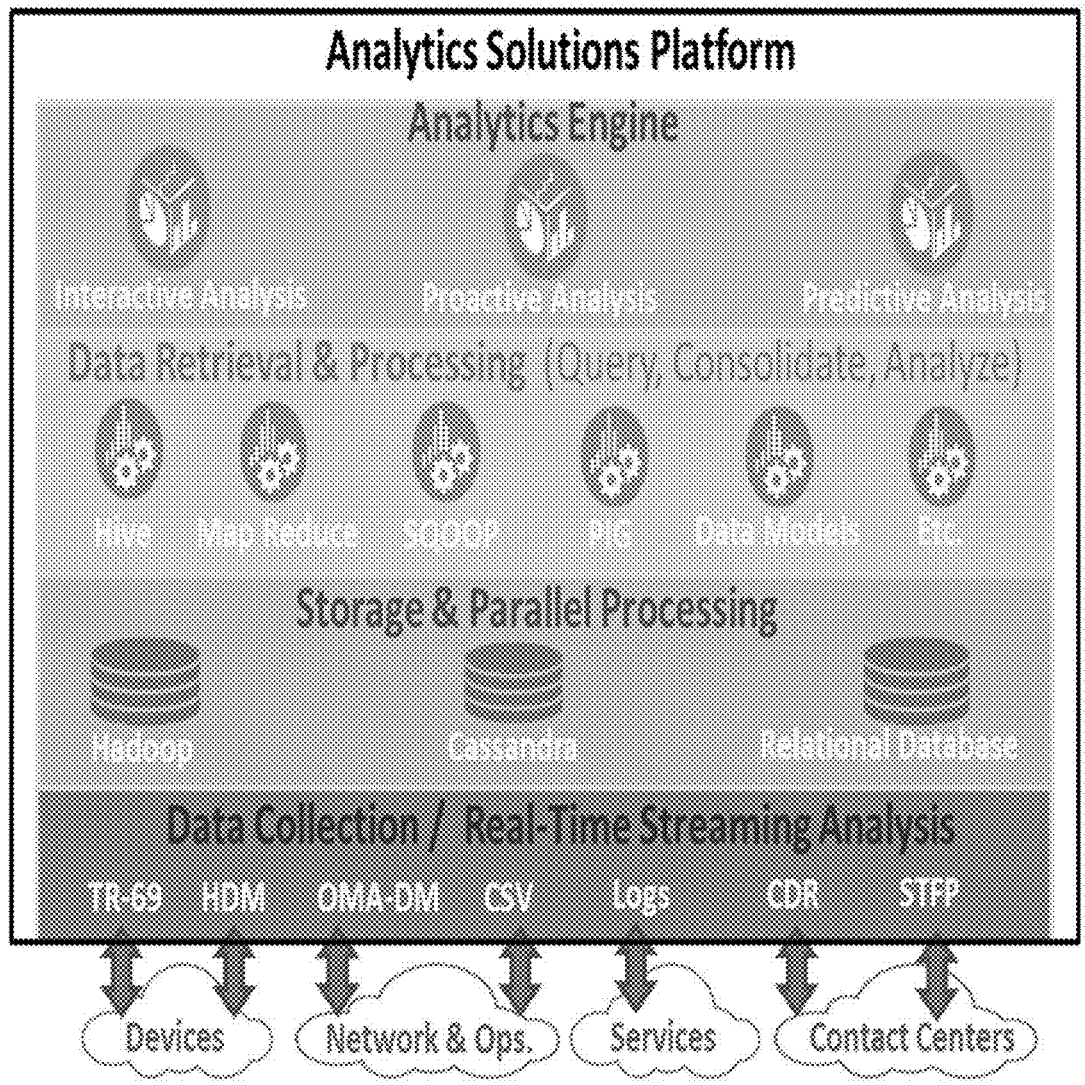
FIG. 2 is an illustration of an fault diagnostics platform.

FIG. 2 is an illustration of a fault diagnostics platform. In some embodiments, generation of fault signatures, comparison and correlation of signatures and general fault analysis is performed by a fault diagnostics platform, such as shown in FIG. 2.

The following are examples of network analytics frameworks based on machine learning used within a fault diagnostics platform, such as that shown in FIG. 2. These frameworks include:

(1) Scalable data collection and real-time streaming analytics;
(2) Massive parallel processing and storage;
(3) Data retrieval and processing;
(4) Analytics engine and business intelligence; and
(5) Domain-specific analytics solutions.

Scalable data collection and real-time streaming analytics allows operators to collect and store any data, as often as they need. TR-069 (Technical Report 069) is a technical specification of the Broadband Forum that defines an application layer protocol for remote management of customer-premises equipment (CPE) connected to an Internet Protocol (IP) network. TR-069 and streaming video QoE (quality of experience) clients can be used to collect data from devices. The video can be analyzed using image recognition to detect features and derive data for use by the processing engine of the QoE estimation module. In some embodiments, data is collected about network operations, services, and call center interactions using, for example, Comma separated Value (CSV) files, logs, CDRs (a proprietary file format primarily used for vector graphic drawings), and Secure File Transfer Protocol (SFTP). A CSV is a comma separated values file that allows data to be saved in a table structured format. CSVs look like garden-variety spreadsheets. However, CVS files have a ".csv extension". Traditionally they take the form of a text file containing information separated by commas, hence the name. A CDR is a file extension for a vector graphics file used by Corel Draw, a popular graphics design program. Corel Paint Shop Pro and Adobe illustrator 9 and later can also open some CDR files. FTP (File Transfer Protocol) is a popular method of transferring files between two remote systems. SFTP is a separate protocol packaged with SSH that works in a similar way over a secure connection.

Massive parallel processing and storage uses HADOOP for big data storage and batch processing, CASSANDRA for real-time data analytics (for example, for real-time customer support), and relational database for data storage for reports and dashboard tools. HADOOP is an open source, Java-based programming framework that supports the processing and storage of extremely large data sets in a distributed computing environment. It is part of the Apache project sponsored by the Apache Software Foundation. Apache CASSANDRA is a free and open-source distributed NoSQL database management system designed to handle large amounts of data across many commodity servers, providing high availability with no single point of failure. A NoSQL (originally referring to "non SQL" or "non-relational") database provides a mechanism for storage and retrieval of data that is modeled in means other than the tabular relations used in relational databases.

Data retrieval and processing can be used that is built on top of HADOOP, and is used for data querying and analysis—using data processing frameworks and tools, such as HIVE (a key component of the HADOOP ecosystem), MapReduce, and SQOOP. SQOOP supports incremental loads of a single table or a free form SQL query as well as saved jobs which can be run multiple times to import updates made to a database since the last import. Imports can also be used to populate tables in Hive or HBase.

Analytics engine and business intelligence consolidates, correlates, and analyzes data for automated actions or human interpretation. This includes filtering and normalization of raw data, and mapping of the data to particular key performance indicators (KPIs) and use case templates.

Domain-specific analytics solutions allow operators to organize the resulting analytics events and alerts into particular business needs, such as home device analytics, online video analytics, or security analytics.

Figure 3:
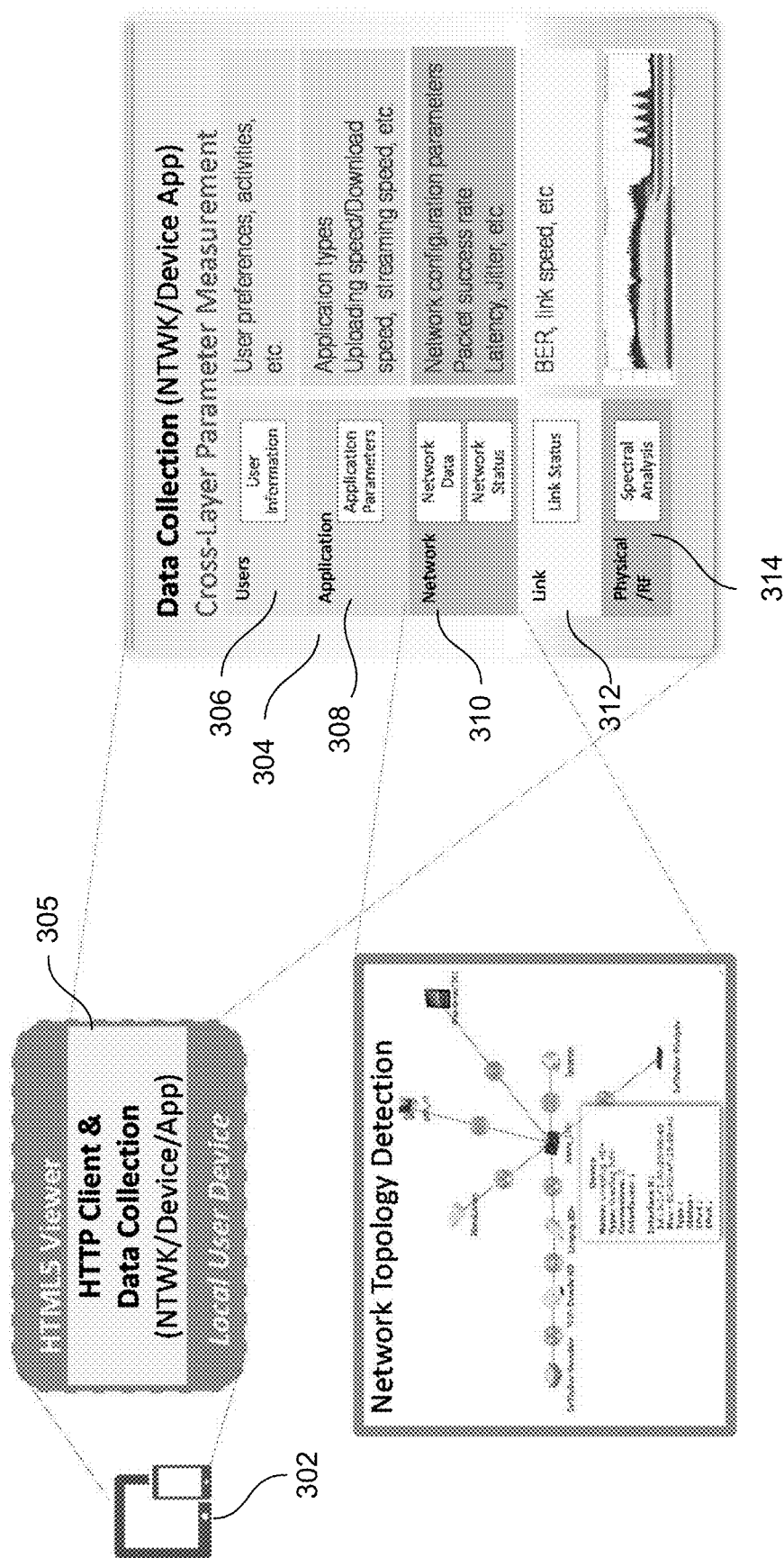
FIG. 3 is an illustration of one example of an architecture that can be implemented in some embodiments of the disclosed method and apparatus to provide fault detection and analysis in accordance with the disclosed method and apparatus.

FIG. 3 is an illustration of one example of an architecture for a network fault diagnostics platform that can be implemented in some embodiments of the disclosed method and apparatus to provide fault detection and analysis in accordance with the disclosed method and apparatus. A local user device 302, such as an IoT device, tablet or smart phone, provides a resource for performing local data collection. The local user device 302 is coupled to the wireless network. A cross-layer parameter measurement data collection (CPM) module 304 within the user device 302 comprises an HTTP Client and Data Collection module 305. The HTTP Client and Data Collection module 305 comprises a user information module 306 configured to accept user input and maintain user preferences, activities, etc. An application module 308 within the CPM module 304 is configured to receive and maintain information from a network to which the local user is coupled. This information includes parameters related to the application types that are present, the upload and download speeds, streaming speeds, etc. A network configuration module 310 within the CPM module 304 is configured to receive information including information regarding network configuration parameters, packet success rates, information regarding latency, jitter, etc. A link status module 312 within the CPM module 304 is configured to collect and maintains parameters, such as bit error rate, link speed, etc. A PHY layer module 314 within the CPM module 304 is configured to receive and/or collect and maintain parameters related to the physical layer (PHY layer) and radio frequency layer (RF layer), such as parameters measured based on a spectral analysis of the RF, IF and baseband signals. In some embodiments, the CPM module 304 is an Internet of Things (IoT) device on which the user information module 306, application module 308, network configuration module 310, and PHY layer module 314 are loaded and executed.

Figure 4:
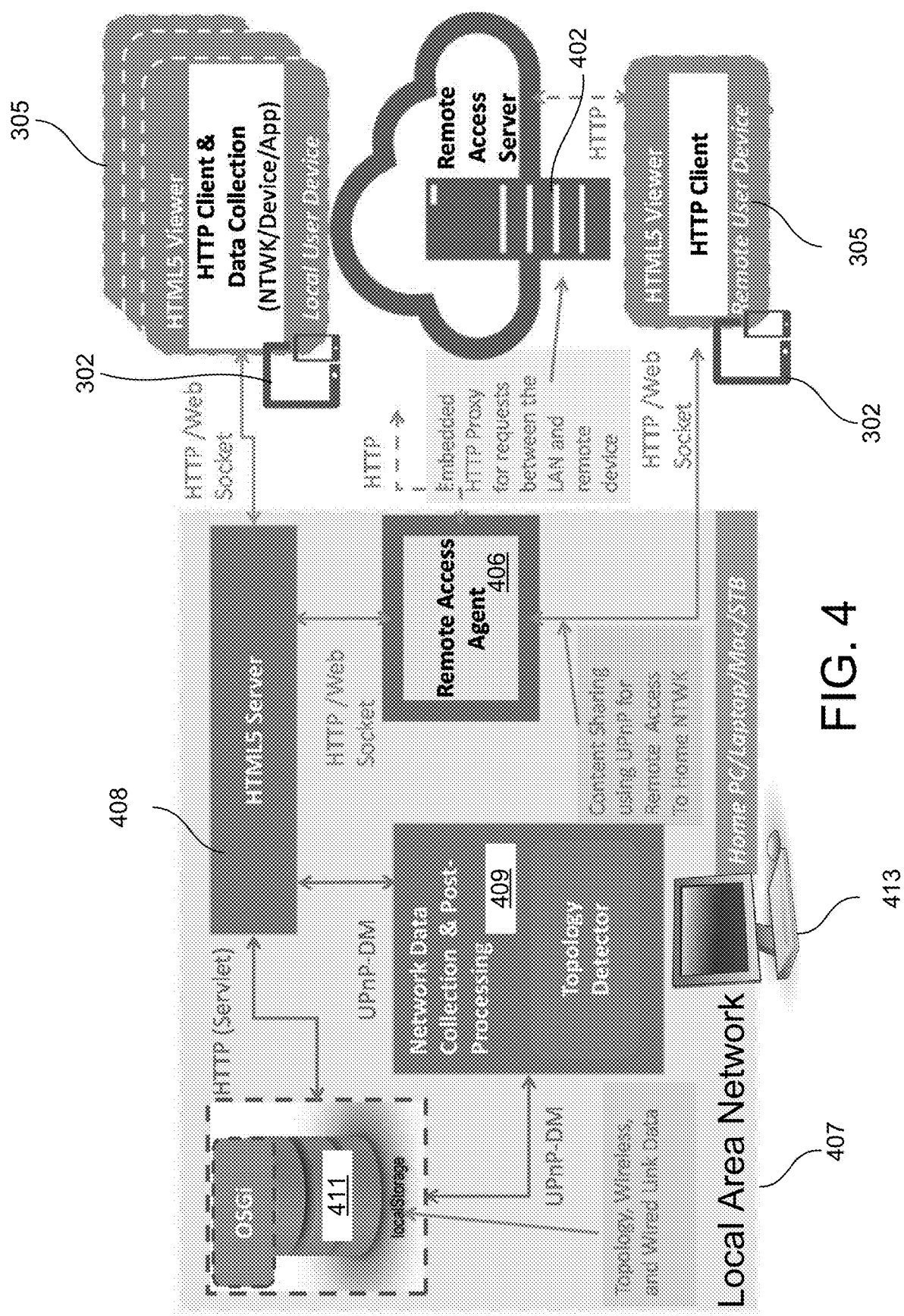
FIG. 4 is an illustration of an architecture that may be implemented in one example of the disclosed method and apparatus.

FIG. 4 is an illustration of an architecture that may be implemented in one example of the disclosed method and apparatus. In this embodiment, a remote access server 402 is coupled to the CPM module(s) 304 that reside in one or more of the remote user devices 302. A remote access agent 406 is provided and is configured to facilitate communication between the remote user devices 302 and a LAN server 408 within a local area network (LAN) 407. In some embodiments, the remote access agent 406 has an embedded HTTP proxy for requests between the LAN 407 and the remote user device 302. In addition, some local user devices 302 are directly connected to the LAN server 408 through an interface, such as an HTTP/Web socket. In some embodiments, the LAN server 408 maintains and makes accessible to the remote user devices, network parameters. In some embodiments, the LAN 407 may further include a network data collection and post-processing device 409 and a local storage device 411. The local storage device 411 is coupled to the LAN server 408 through the LAN 407. One or more LAN computers 413, such as a home personal computer (PC), laptop computer, tablet, smart phone, etc. may also be present in the LAN 407. The network data collection and post-processing device 409 is coupled to the remote access server 402 through which data collected by the CPM module 304 is provided to the network data collection and post-processing device 409. The network data collection and post-processing device 409 consolidates, correlates and analyzes data and activates automated actions in response to the analysis. This includes filtering and normalization of raw data, and mapping of the data to particular key performance indicators (KPIs) and use case templates used to activate automated actions. In some cases, the filtering and normalization of raw data, and mapping of the data to particular key performance indicators (KPIs) and use case templates is used to determine whether to activate automated actions. In some embodiments the network collection and post processing module 409 organizes resulting analytics events and alerts into particular business needs. The business needs include home device analytics, online video analytics and security analytics. In some embodiments, the network collection and post processing module 409 analyzes video using image recognition to detect defect features and derive data for performing quality of experience (QoE) estimations. In some embodiments, the CPM module 304 is a tablet on which the user information module 306, application module 308, network configuration module, and PHY layer module are loaded and executed. In other embodiments, the CPM module 304 is a smart phone or other device with the ability to maintain and run the other modules.

Figure 5:
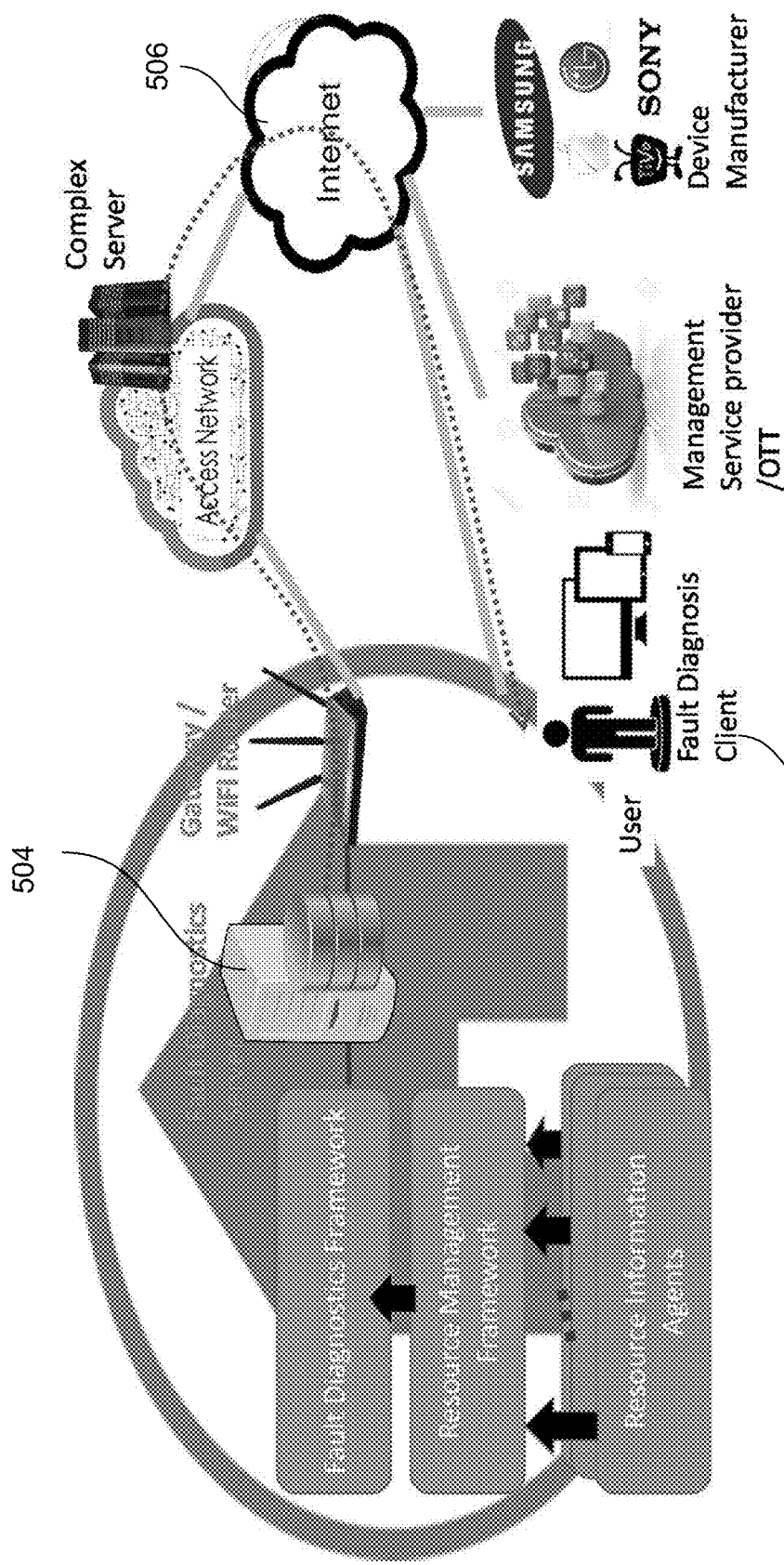
FIG. 5 is an illustration of another example of an architecture in which a fault diagnostic client 502 communicates with a fault diagnostic server 504 through the internet 506.

FIG. 5 is an illustration of another example of an architecture in which a fault diagnostic client 502 communicates with a fault diagnostic server 504 through the internet 506.

Figure 6:
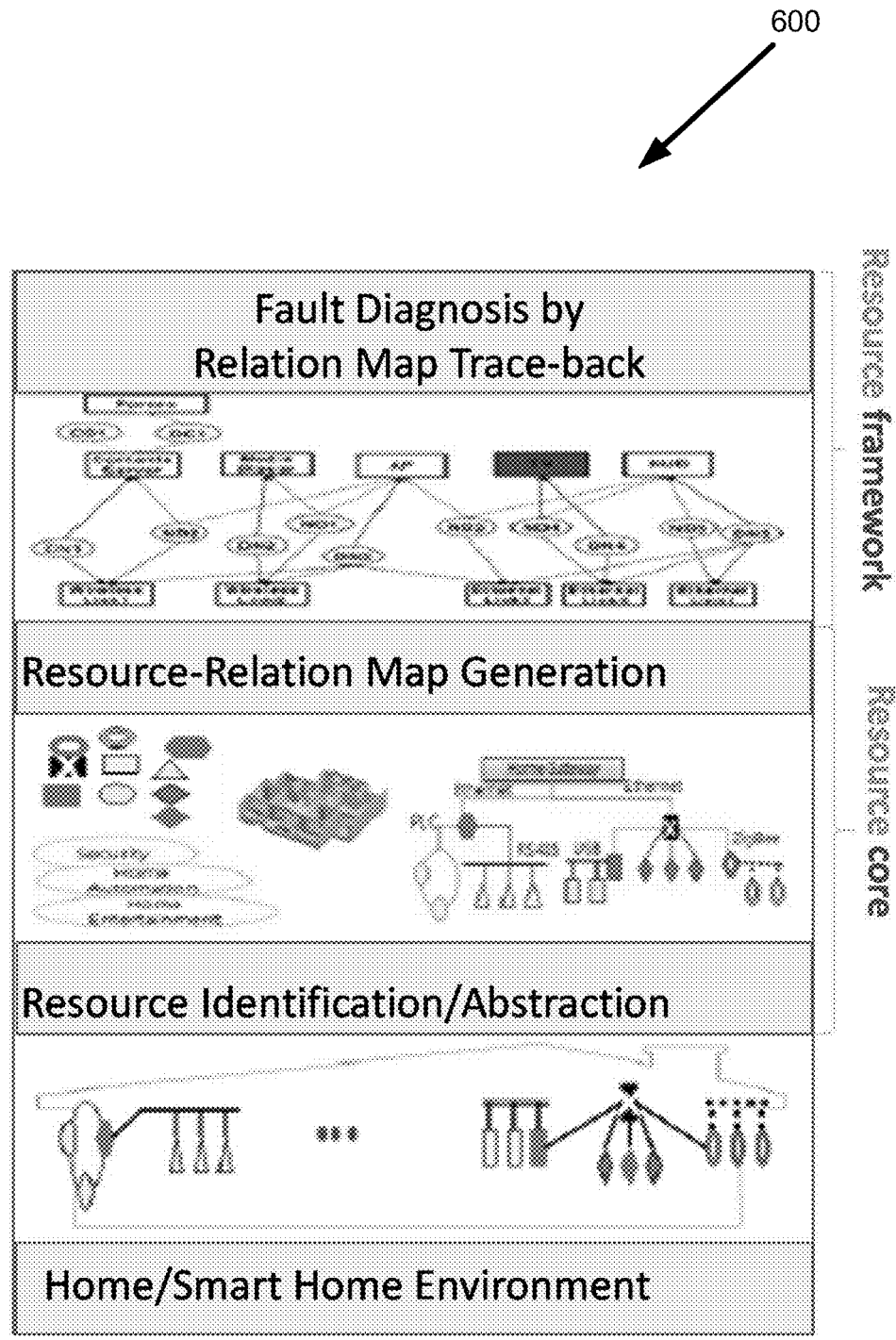
FIG. 6 is an illustration of a smart home environment 600 and the associated logical components of such a smart home environment 600 in accordance with the disclosed method and apparatus.

FIG. 6 is an illustration of a smart home environment 600 and the associated logical components of such a smart home environment 600 in accordance with the disclosed method and apparatus.

What is claimed is:

1. A network fault diagnostics platform comprising:
   a. local user cross-layer parameter measurement data collection (CPM) module, the CPM module comprising (1) a user information module configured to accept user input regarding user preferences and activities, (2) an application module configured to receive information from a network to which the local user device is coupled, the received information including types of applications that are present, upload and download speeds, and streaming speeds, (3) a network configuration module configured to receive information regarding packet success rates, information regarding latency and jitter, (4) a PHY layer module configured to receive information regarding the radio frequency (RF) layer, including parameters based on a spectral analysis of the RF, intermediate frequency (IF) and baseband frequency signals;
   b. a remote access server coupled to the CPM module; and
   c. a network data collection and post-processing device coupled to the remote access server and configured to receive through the remote access server, data collected by the CPM module and to consolidate, correlate and analyze data and activate automated actions in response to the analysis;

wherein the network collection and post-processing module further filters and normalizes raw data and network collection and post-processing module further maps data to use case templates used to determine whether to activate the automated actions and the network collection and post processing module further analyzes video using image recognition to detect defect features and derive data for performing quality of experience (QoE) estimations.

2. The network fault diagnostics platform of claim 1, wherein the network collection and post-processing module further maps data to particular key performance indicators used to activate the automated actions.

3. The network fault diagnostics platform of claim 1, wherein the network collection and post processing module further organizes resulting analytics events and alerts into particular business needs.

4. The network fault diagnostics platform of claim 3, wherein the particular business needs include home device analytics, online video analytics and security analytics.

5. The network fault diagnostics platform of claim 1, wherein the CPM module is an Internet of Things (IoT) device on which the user information module, application module, network configuration module, and PHY layer module are loaded and executed.

6. The network fault diagnostics platform of claim 1, wherein the CPM module is a tablet on which the user information module, application module, network configuration module, and PHY layer module are loaded and executed.

7. The network fault diagnostics platform local user device of claim 1, wherein the CPM module is a smart phone on which the user information module, application module, network configuration module, and PHY layer module are loaded and executed.

8. A network fault diagnostics platform comprising:
a. local user device having a display device, a user input device and a cross-layer parameter measurement data collection (CPM) device, the CPM module comprising (1) a user information module configured to accept user input regarding user preferences and activities, (2) an application module configured to receive information from a network to which the local user device is coupled, the received information including types of applications that are present, upload and download speeds, and streaming speeds, (3) a network configuration module configured to receive information regarding packet success rates, information regarding latency and jitter, (4) a PHY layer module configured to receive information regarding the radio frequency (RF) layer, including parameters based on a spectral analysis of the RF, intermediate frequency (IF) and baseband frequency signals;
b. a local area network (LAN) server coupled to the local user device;
c. a local storage device coupled to the LAN server for storing information regarding the topology of the network, information regarding wireless connections between elements of the network and information regarding wired links between elements of the network; and
d. a network data collection and post-processing module coupled to the LAN server and configured to receive and process network related data received from the local storage device and to activate automated actions in response to the processed network related data;
wherein the network collection and post-processing module further filters and normalizes raw data and network collection and post-processing module further maps data to use case templates used to determine whether to activate the automated actions and the network collection and post processing module further analyzes video using image recognition to detect defect features and derive data for performing quality of experience (QoE) estimations.

9. The network fault diagnostics platform of claim 8, further comprising a remote access agent and a remote user device coupled to the remote access agent, the remote access agent coupled to the LAN server and configured to provide data from the network data collection and post-processing module to the remote client device via the LAN server.

10. The network fault diagnostics platform of claim 9, wherein the remote user device is coupled to the remote access agent by a web socket.

* * * * *